(12) United States Patent
Bibas

(10) Patent No.: US 11,709,356 B2
(45) Date of Patent: Jul. 25, 2023

(54) ENHANCED BEAM DIRECTOR WITH IMPROVED OPTICS

(71) Applicant: Charles Bibas, Great Neck, NY (US)

(72) Inventor: Charles Bibas, Great Neck, NY (US)

(*) Notice: Subject to any disclaimer, the term of this patent is extended or adjusted under 35 U.S.C. 154(b) by 159 days.

(21) Appl. No.: 17/185,870

(22) Filed: Feb. 25, 2021

(65) Prior Publication Data
US 2021/0263302 A1      Aug. 26, 2021

Related U.S. Application Data

(60) Provisional application No. 62/981,128, filed on Feb. 25, 2020.

(51) Int. Cl.
| | | |
|---|---|---|
| *G02B 26/10* | (2006.01) | |
| *G02B 5/10* | (2006.01) | |
| *G02B 26/08* | (2006.01) | |
| *G02B 27/14* | (2006.01) | |

(52) U.S. Cl.
CPC ............... *G02B 26/10* (2013.01); *G02B 5/10* (2013.01); *G02B 26/0816* (2013.01); *G02B 27/14* (2013.01)

(58) Field of Classification Search
None
See application file for complete search history.

(56) References Cited

U.S. PATENT DOCUMENTS

| | | | | |
|---|---|---|---|---|
| 5,151,812 A | * | 9/1992 | Watson | G02B 26/10 348/E3.01 |
| 5,367,399 A | * | 11/1994 | Kramer | G02B 26/106 250/236 |
| 5,408,352 A | * | 4/1995 | Peng | G06K 7/10871 250/236 |
| 5,434,696 A | * | 7/1995 | Watson | G02B 26/10 359/201.1 |
| 5,555,125 A | * | 9/1996 | Peng | G06K 7/10693 250/236 |
| 10,416,444 B2 | * | 9/2019 | Bibas | G02B 27/0983 |

FOREIGN PATENT DOCUMENTS

JP             02226111 A   *   9/1990

* cited by examiner

*Primary Examiner* — Jennifer D. Carruth

(57) ABSTRACT

A beam director for use in 3D printers comprises a first mirror rotating about its longitudinal axis for redirecting a beam onto a second mirror and then onto a work surface, which may result in a beam with a distorted shape. A beam corrector, e.g. a lens or a reflective surface, is used to ensure the beam has the same desired dimensions in the first and second perpendicular direction when striking the work surface.

20 Claims, 14 Drawing Sheets

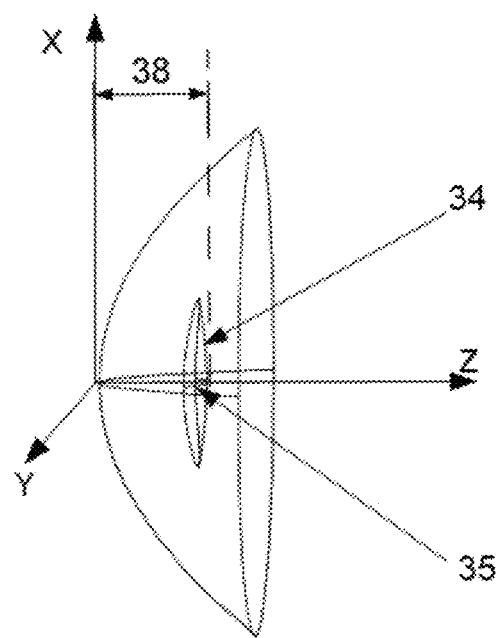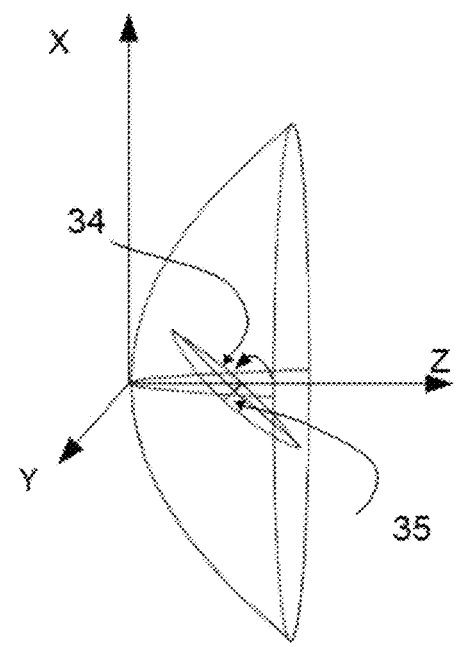
Fig. 22A                    Fig. 22B

ENHANCED BEAM DIRECTOR WITH IMPROVED OPTICS

APPLICATION

This application incorporates by reference and claims priority to and the benefit of, US Provisional Patent Application Ser. No. 62/981,128 with filing or 371(c) date of Feb. 25, 2020.

TECHNICAL FIELD

The present invention relates to a beam director, and in particular to a beam director for a 3D printer including a first rotating reflector and a second rotating annular reflector.

BACKGROUND

A beam director for use in 2D and 3D printers, such as the one disclosed in U.S. Pat. Nos. 9,435,998, 10,416,444 and 10,473,915, which are incorporated herein by reference, comprises a first mirror rotating about its longitudinal axis, with a reflective surface at an acute angle to the longitudinal axis. Accordingly, a beam transmitted along the longitudinal axis may be redirected onto a second mirror, and then to a work surface, which is typically perpendicular to the longitudinal axis.

SUMMARY

The present invention relates to a beam director comprising:

a rotatable first reflector rotatable about a longitudinal axis for receiving a beam from a beam source along the longitudinal axis, the first reflector including a reflective surface at an acute angle to the longitudinal axis for reflecting the beam;

an actuator for rotating the first reflector about the longitudinal axis, whereby the first reflector rotates and reflects the beam at a constant angle to the longitudinal axis;

a second annular reflector rotated by the actuator and rotating in a circle around the longitudinal axis of first reflector as first reflector rotates; constantly facing the first reflector at a constant angle; the second reflector further configured to reflect the beam towards a work surface at a constant angle thereto, whereby when the beam is activated and the actuator rotates the first and second reflectors, the beam strikes the rotating first reflector rotating the beam and reflecting the beam to the second reflector, which reflects the beam to the work surface; the beam then following a curve path relative to the work surface, tracing out an arc on the work surface.

The annular reflector M2 is a structure where each point on the surface encircles M1 optical Axis Z. Mathematically, any point on the surface circling the optical axis Z is at the same distance to the optical Axis. Conceptually, if we slice the annular structure surface into an unlimited number of slices, then each slice is a circle where the Z is at the center of any of the slices.

The Optical challenges in focusing a beam on the work surface are dictated among other parameters by the system geometry and beam source parameters such as:

beam source distance to the first Mirror
the distance from the First Mirror to the second Mirror
the distance between the second mirror to the work surface
Beam source form such as collimated or non collimated
Beam source type as light, Single mode laser, Multi mode laser, or Fiber laser.
Beam quality as quantified by the Beam Parameter Product (BPP)

This application addresses focusing of the beam at the work surface 1 at a point 7, where the beam source is either collimated or non collimated by embedding into the rotating first reflector and/or the second reflector optical reflection functions. Therefore, minimizing optical components and reducing parts count and reducing calibration procedures. The optical reflection functions are dictated by the surface geometries.

Yet, another aspect of this application is to control the beam size when striking the work surface 7. Furthermore, this application also addresses the different types of beam source such as fiber laser in either multi mode or single mode.

Accordingly, an object of the present invention is to address the optical components for handling the beam of the prior art by providing corrective elements, whereby the beam has the same dimension in the first and second directions when incident on the work surface or when the beam keeps the proportion between the first and second directions when incident on the work surface. Where the first direction and the second direction are the local beam coordinates denoted by lower case x and y cartesian coordinates system.

Surfaces can be expressed in many ways. One way we'll be using in this application is to define a surface by two orthogonal curvature lines Cx 13 and Cy 14 where their vertices meet at the optical Axis FIG. 8. We'll be also applying other ways to define a surface.

Yet, another aspect of this invention is to control the beam to come into focus on both x and y dimensions on the work surface.

Another aspect of the invention is to control the beam size on both x and y at the print surface, Yet, another aspect of the invention is to focus a non symmetrical source beam such as a rectangle source.

Another aspect of this invention is to control the beam to come into focus on one dimension. Either the x or the y dimension. Such features can be used to control the pixel logical size 25 by 25 were pixel logical size composed of moving physical pixel size and it can be expressed by:

$$\text{Logical\_Pixel\_size [mm}^2\text{]} = \text{physical\_pixel\_size [mm]} * Vb \text{ [mm/sec]} * T \text{ [sec]}$$

Where Vb is the moving beam speed and Tp the time traveling over a logical pixel. Additionally when using a single mode beam or a fiber laser with small clade diameter then the desired beam size may be larger than the smallest focal beam size of the single mode laser or a fiber. Therefore, the beam size at the work surface needs to be adjusted.

The second reflector may take the form of a rotating reflector or a stationary arcuate reflector, which is used to reflect the beam along straight or arcuate paths on the work surface. We'll analyse the stationary second reflector, however, all analysis applied also to a physically rotated second reflector as well. When applying the analysis to a rotating physical second reflector then a vertical slice is cut from the stationary reflector to be used as the physically rotated second reflector.

BRIEF DESCRIPTION OF THE DRAWINGS

FIG. 22A M1, M2 construction and placement.

FIG. 22B. Pitch of M1 around the Y axis

DETAILED DESCRIPTION

The objective of this invention is to provide solutions to focusing and controlling the beam size at the work surface in a Beam Director System.

Glossaries and Definitions

The glossaries and definition will help a skilled in the art understand the terms and methods used in this application. More optical clarification and properties can be found in Optical System Design, by Robert E. Fischer Second Edition.

Figure 8:
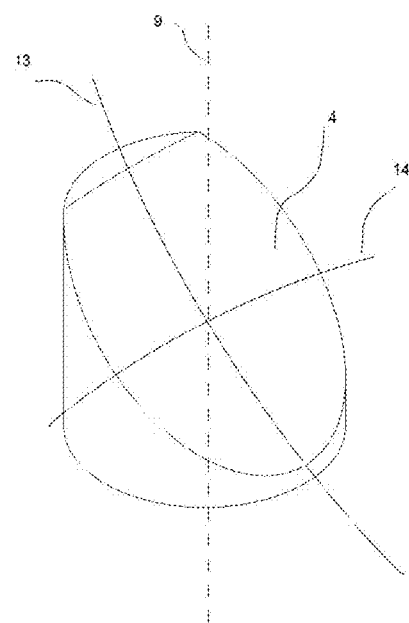
FIG. 8. Illustrates M1 mirror with the surface curvatures

Asp—Aspherical value in defining surfaces defining departure from a spherical profile. curvature—C curvature is the reciprocal of R the radius.

curvatures of surfaces—Cx 13 and Cy 14 as shown in FIG. 8 are orthogonal curvatures defining a surface where Cx and Cy where the vertex curvatures meet at the optical axis as shown in FIG. 8. Beam—Beam of light. Beam Parameter Product (BPP)—Is the product of a laser beam's divergence angle (half-angle) and the radius of the beam at its narrowest point. Lower case x, y and z coordinates—denotes local beam coordinates:

In this application we define a lower case x,y and z coordinate system that is cartesian coordinates that are local to the beam. Lower case z denotes the direction of the beam while x and y denotes the beam size. Therefore, any reference to lower case x,y or z axis will be referring to local coordinates of the beam along the optical axis 3. Where z is also is the optical axis. x0, y0—is the starting coordinates of a beam in a system where the beam is bounced from surface to surface.

surface function—is defined by a 2D function that is rotated around the Z axis or around a parallel axis to the Z axis. xn, xn—is the n surface coordinate of the beam starting from the beam source where x0, y0 is the source beam, x1, y1 is the first surface in the beam path and so on. xfinal, yfinal—are the last surface coordinate of the beam. Logical Pixel—is a pixel composed of a moving physical beam where the loggal pixel size is controlled by the moving speed and the activation time of the physical beam. Lower case coordinates denote also local coordinates for surface construction formulas.

M1 4 and M2 2 are the first and second mirror respectively. Flat M1—referred to flat surface mirror.

Flat M2—Using cone surface where M2 surface function is defined as a 2D surface function of y=x−R0 rotating around the Y axis where R0 is the Radius of the cone at the base. Flat M2 also referred to as cone M2.

Physically rotated reflector—is a rotator that is physically rotated about a rotational axis. As the physical rotated reflector rotates it is facing the first reflector, therefore reflecting the beam received from the first rotator and reflects the beam to the work surface.

Optical distance—a distance measured by summing the total optical path from starting point to ending point along the optical axis.

Units—Although, this doc will be using mm units. It could be either in inches or any other units or multipliers when using multipliers then all unit dimensions need to be corrected by the same multiplier. Upper case X,Y and Z denotes global system coordinates as shown in FIGS. 1, 2, 6, and 7.

WFE—Wave front error. This quantity is computed from each ray trace and it used to represent the delay between ray start and ray finish surfaces. The total root-mean-square WFE is calculated from the deviations in WFE within each group of rays.

A beam source 5 may be configured to generate a beam of light, which is collimated, non collimated or non symmetrical, such as rectangle-like shape.

The following sections cover the various solutions based on a stationary M2 reflector 2. The same solution applies for a physically rotating M2 reflector, where a small section of the M2 reflector is implementing the same surface formula and analysis as in the non rotating M2 reflector. When referring to the M1 or M2 reflectors, the disclosure is referring to a first reflector surface 4 or the second reflector surface 2 respectively.

The M2 reflector may be an annular structure where each point on the surface encircles the optical Z Axis 9. Mathematically, any point on the surface circling the optical Z axis 9 may be at the same distance to the optical Z Axis 9. Conceptually, if we slice the annular structure surface into an unlimited number of slices, then each slice may be a circle where the optical axis Z 9 is at the center.

The M2 surface function may hereby be defined by a 2D function that is rotated around the Z axis or around parallel to the Z axis. As an example y=a*x is a linear function y(x) representing a cone structure when y(x) is rotated around the z axis where a is the tangent of the cone half angle.

Conic sections are surface functions as they defined as follows:
mathematical curves (parabolas, hyperbolas, circles, etc.) that satisfy quadratic algebraic expressions (See Optical System Design, Robert E. Fischer Second Edition, Chapter 7 Page 117). Geometrically, they are equivalent to the intersection of a cone with a plane, hence the name. When a conic section is rotated about an axis, it sweeps out a surface in three dimensions (paraboloid, hyperboloid, sphere or ellipsoid). Surfaces of this type are very useful in optics and defined by the following equation in the Vertex origin Cartesian coords:

$$z(r) = C \cdot r^2 / (1 + \sqrt{1 - (1 + \text{Asph}) \cdot C^2 \cdot r^2})$$

Where: $r^2 = x^2 + y^2$
where:
C: is the curvature of a surface: positive for a surface curving towards +z, and negative if curving towards −z. 0 (Zero) curvature is a flat surface (as the radius is 1/C for a flat surface the radius is infinite).
Asph or Asp dictates the surface classification as Asp defined as a departure from a sphere. Asp with a 0 value specifies a sphere. As an example, the Asp value of −1 specifies a paraboloid, −1<Asp<0 specifies prolate ellipsoid, Asp>0 specifies oblate ellipsoid, and Asp<−1 specifies hyperboloid.

Similarly, z(r) the surface function may be expended representing polynomial coefficients as well to fulfill the imposed conditions.

$$z(r) = C \cdot r^2 / (1 + \sqrt{1 - (\text{Asph}+1) \cdot C^2 \cdot r^2}) + A_1 \cdot r + A_2 \cdot r^2 + \ldots + A_j \cdot r^j$$

This function provides a greater level of flexibility whereas an example setting C=0 and all coefficients to 0 but A1 creates a cone structure.

A toric surface is the surface swept out when a function z(y) below is rotated about an axis that is parallel to the y axis. This surface function can be zero, circular conic, or include polynomial terms.

$$z(y) = C \cdot y^2 / (1 + \sqrt{1 - (\text{Asph}+1) \cdot C^2 \cdot y^2}) + A_1 \cdot y + A_2 \cdot y^2 + \ldots + A_{14} \cdot y^{14}$$

When this z(y) curve is revolved about an axis parallel to the local y axis, the resulting toric surface is exactly circular in its xz plane, and is exactly the specified function in the yz plane. In this document when referring to toric surface C will be marked Cx' where Cx' is the reciprocal of the radius in the xz plane to which it is positive if bending towards +z or negative if bending towards −z.

x,y, and z are all measured with respect to the vertex and are oriented so that z lies normal to the surface at its vertex. When tilting a surface it is about the x axis when pitching a surface it is about its y axis.

Please also note: biconic surface is a surface with an additional degree of flexibility where the spherical component of a toric is aspherical where Cx and Cy curvature are aspherical and use AspX and AspY to quantify the departure from asphericity. when the AspX or AspY is zero then a toric surface is formed.

When referring to the M1, M2 surface in this application, the reflector M2 2 will be mostly defined by a toric function while reflector M1 with biconic. When M2 and M1 presenting the same family such as parabola then both can be represented with the same system.

Additionally or alternatively, only polynomials may be used for the complete definition of the surface 2 while imposing the required specifications.

$$z(r) = A_0 \cdot r^0 + A_1 \cdot r^1 + A_2 \cdot r^2 + A_3 \cdot r^3 + \ldots + A_j \cdot r^j$$

Polynomial terms are useful on their own, without curvature or asphericity, in polynomial optics such as Schmidt correctors. More often they are combined with curvature and asphericity to provide small high-order corrections to a surface. Usually, only the first few even coefficients are sufficient as A2, A4, and A6 since most optical surfaces will be very nearly approximated by the conic aspheric profile.

$$z(r) = C \cdot r^2 / (1 + \sqrt{1 - (\text{Asph}+1) \cdot C^2 \cdot r^2}) + A_2 \cdot r + A_4 \cdot r^4 + \ldots + A_j \cdot r^j$$

Figures 9, 9A:
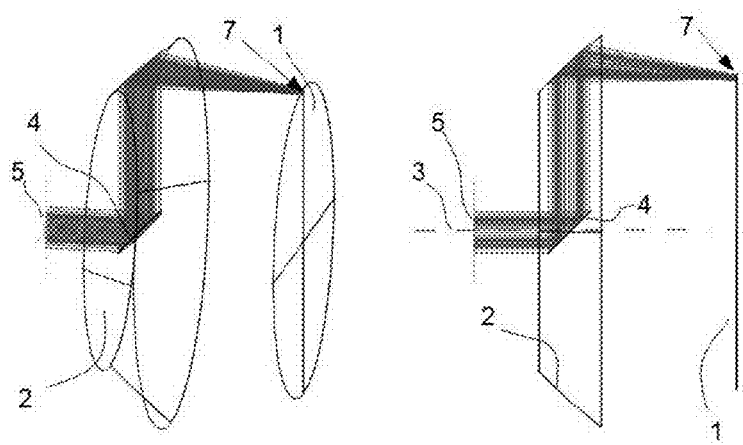
FIG. 9. An isometric view of the M1, M2 focusing a beam source on to the work surface FIG. 9A. Side view of FIG. 9 where the beam source is collimated FIG. 9B. Side view of M1, M2 focusing system where the beam source is diverging FIG. 9C. Side view of M1, M2 focusing system where the beam source is diverging where M1 is collimating the source beam FIG. 9D. Side view of the M1, M2 system where M1 and M2 converging the collimated source beam FIG. 10. Isometric system for toroidal M2 surface M2 focusing a rotating beam FIG. 11. A side view of FIG. 10 system FIG. 12 Implementation of FIG. 10 with an additional rotating mirror instead of rotating light source FIG. 13. Diverging beam source FIG. 14. Desired Beam shape and size at the work surface for the input beam in FIG. 13.

When the light beam 3 transmitted by the beam source 5 is collimated then the first M1 reflector 4 may be a flat mirror whereby the second M2 reflector 2 may be performing the focus of the beam 3 as in FIGS. 9 & 9A. The second M2 reflector surface 2 may be changing the striking collimated beam 3 to a non collimated beam where the x & y dimension of the beam is converging into focus or a desired dimension.

Figure 7:
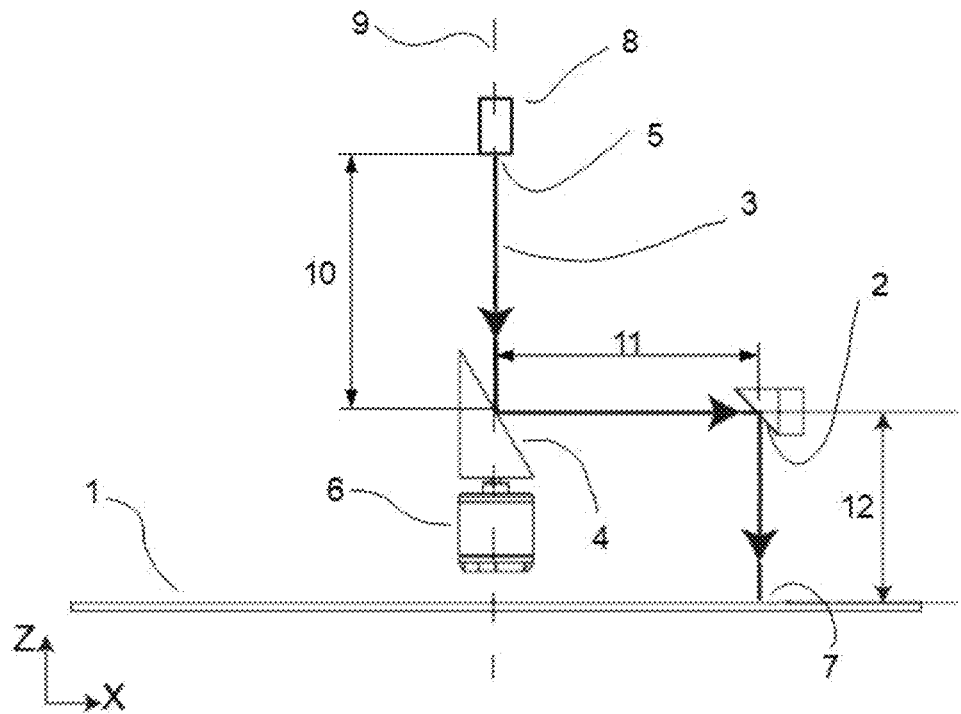
FIG. 7. Side view of a beam director system including a beam source

In another aspect of the invention, when a collimated beam 3 strikes the first M1 reflector 4. When the first M1 reflector 4 is flat, the first M1 reflector 4 may be changing the beam moving direction from the Z axis 9 to rotational about the Z axis 9 while keeping the beam collimated. Preferably, a 45° angle between the beam source optical axis 9 to the first M1 reflector surface 2 as shown in FIG. 7. A non flat second M2 reflector 2 may be changing x in a nonlinear correlation when a linear correlation refers to the standard thin lens formula.

With reference to FIG. 7, when the first M1 reflector 4 is flat, the first M1 reflector 4 keeps local x,y beam components in tack. The second M2 reflector 2 may include an annular, e.g. cone, structure configured to change the x component by definition as it will bring into focus the x component in a distance of about R, where R is the distance 11 and may also be equal to the distance 12 when the second M2 reflector 2 is conical, from the optical axis 9 of the beam source 5 and/or the first M1 reflector 4 to the second M2 reflector 2 when the cone is constructed with a linear line of about 45°.

Using the conical surface for the second M2 reflector surface 2, the function may be defined as a 2D surface function of y=x−R0 rotating around the y axis where R0 is the Radius of the cone at the base. This function as shown in U.S. Pat. No. 10,416,444 can correct the beam size to be the same in both dimensions at a predetermined distance to the work surface.

Figure 1:
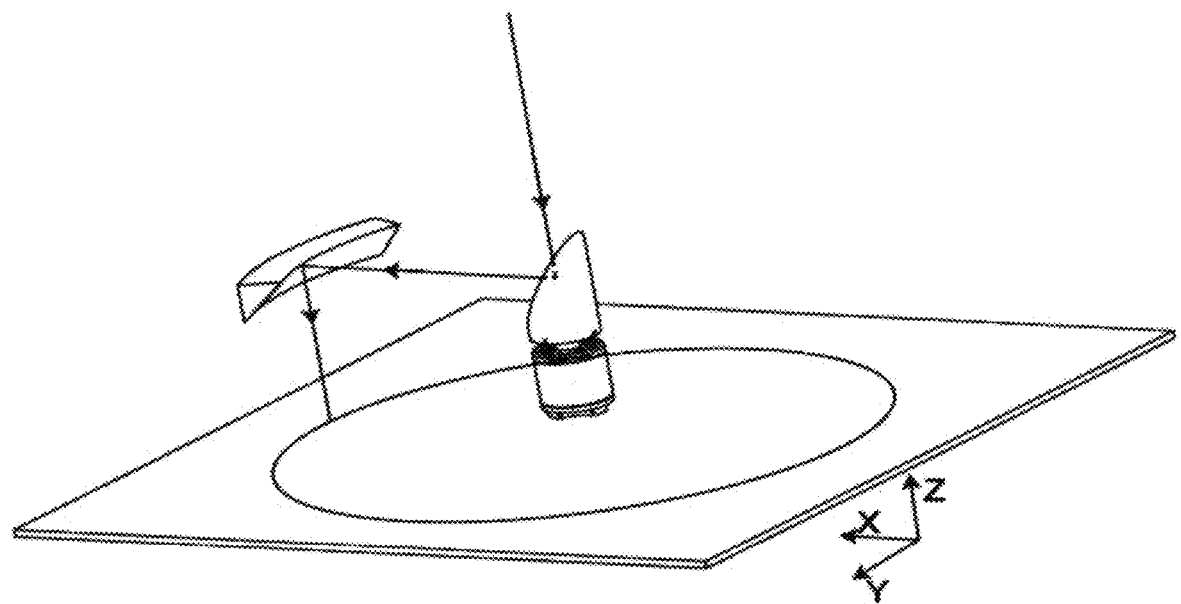
FIG. 1. Is an isometric view of a prior Art of beam director system
Figure 2:
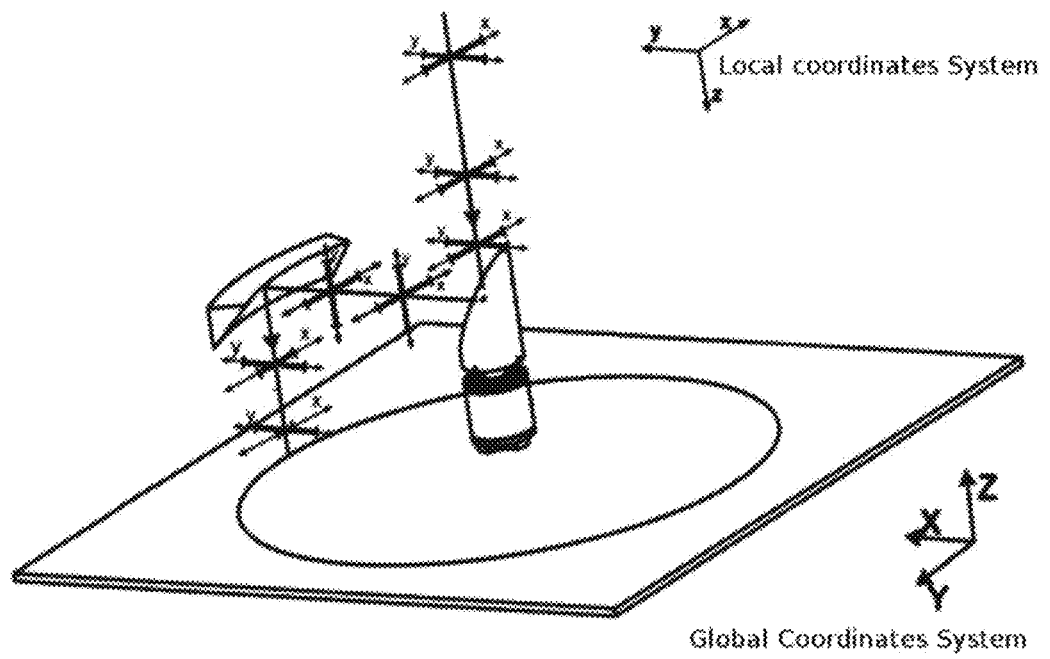
FIG. 2. Prior Art view of a beam director system with two coordinates system; beam local coordinates and global coordinates FIG. 3. Is an isometric view of a Beam director with collimated beam source using a cone second reflector (Prior Art)
Figure 3:
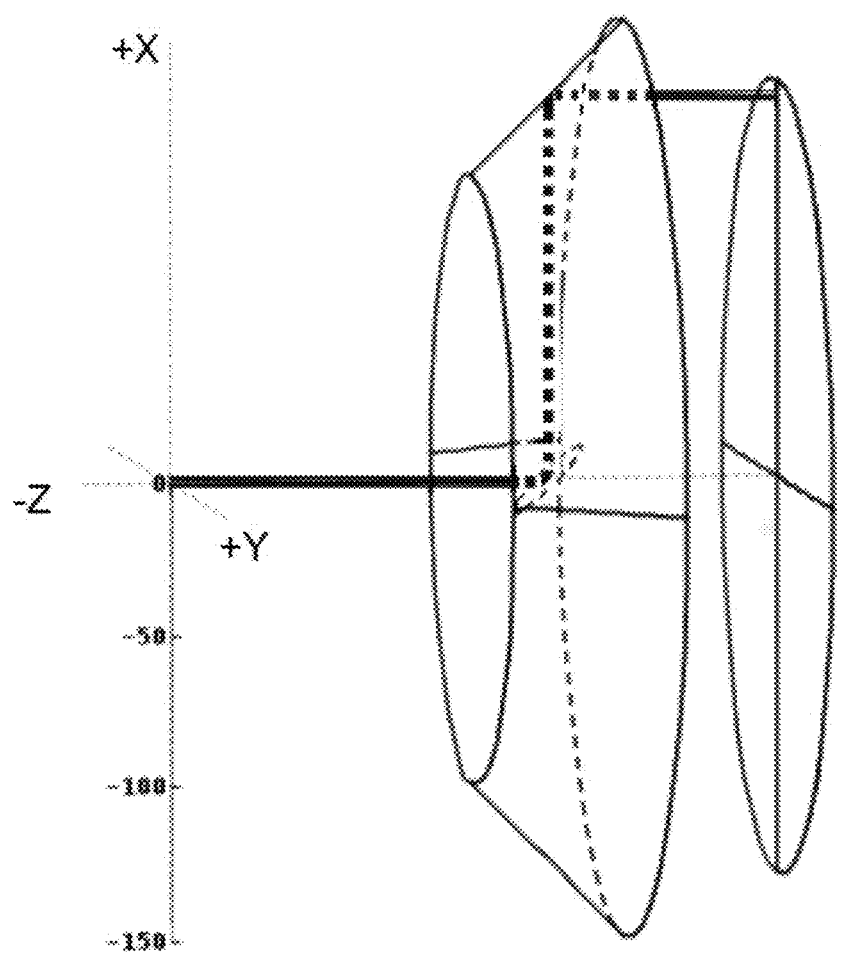
Figure 4:
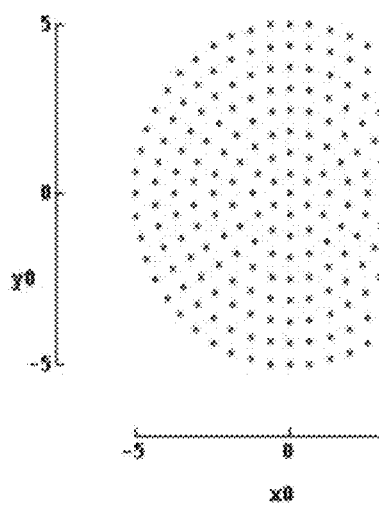
FIG. 4. Illustration of Collimated beam source
Figure 5:
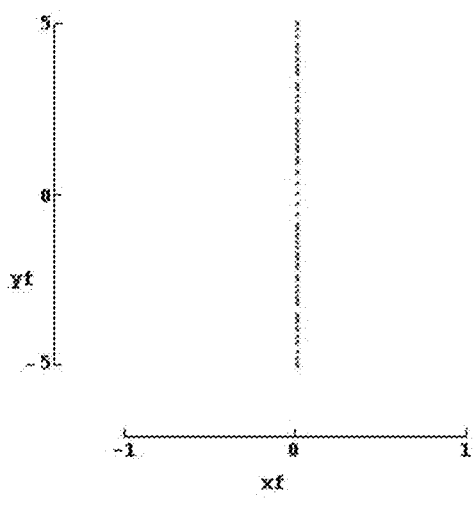
FIG. 5. Beam shape and size at the work surface for Collimated beam input using FIG. 3 system.
Figure 6:
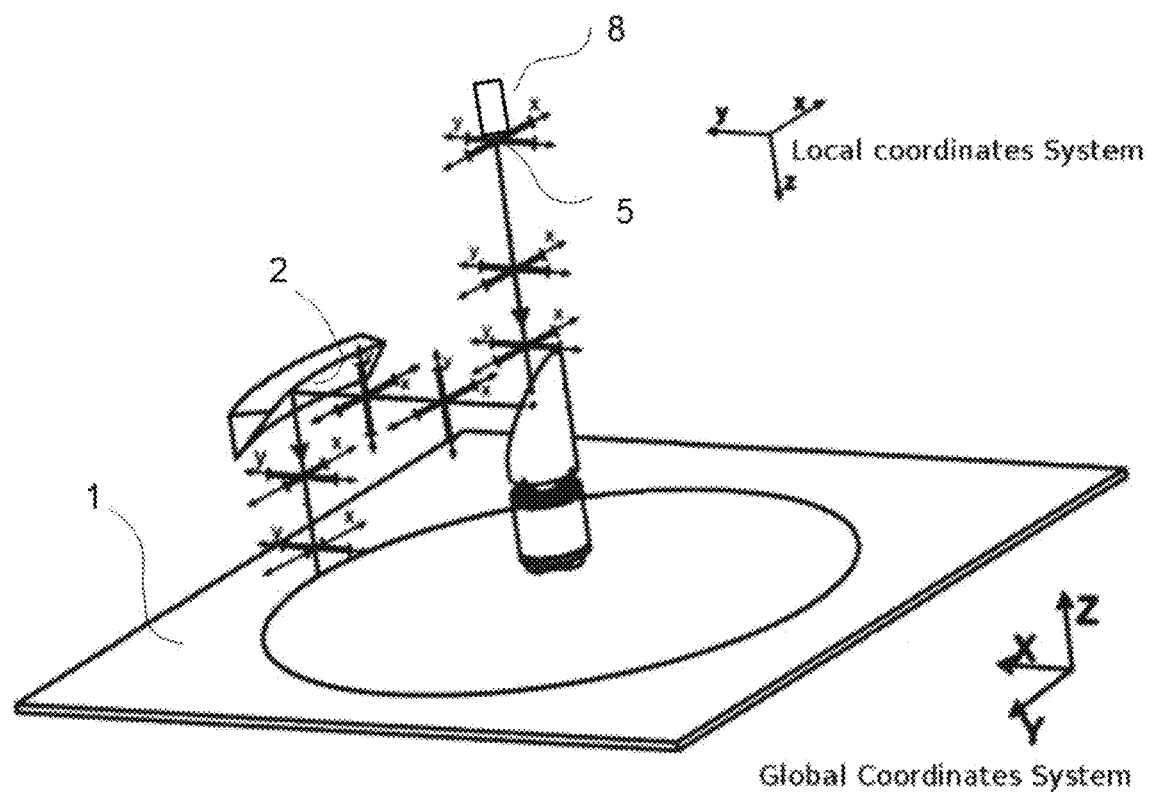
FIG. 6. Isometric view of a beam director system including a beam source with local and global coordinate systems.

Relating to the cone structure in FIG. 3 (Prior Art). One way to focus the beam is by using a cylindrical lens on the y component of the beam with focal point Fy where fy is larger than 2*R and position at an optical distance Fy from the work surface 7. Although Fy can have multiple values larger than 2*R, it is recommended to use a value closer to 2R. This will ensure that the beam in the x and y dimensions are diverging or converging in about the same rate. As an example selecting a cylindrical lens Fy of 5/4*R and positioned at a distance of %*R from M1 is a sound solution using U.S. Pat. No. 1,046,444.

When using a laser source with BPP that enables (the lower the BPP the better) focus to a smallest beam size of W0 in diameter. Where the provided beam source is collimated with a beam diameter size 2*ho (e.g. 5 mm for a 10 mm beam diameter) and a BPP sufficient to bring the beam to small focus W0 of (e.g. 2 um when using a single mode laser).

Using cone structure M2 as in FIG. 3. A Logical Pixel LP can be constructed from the W0 physical pixel using any one of the following methods:

Solve by Adding Cylindrical Lens Method

Figure 18:
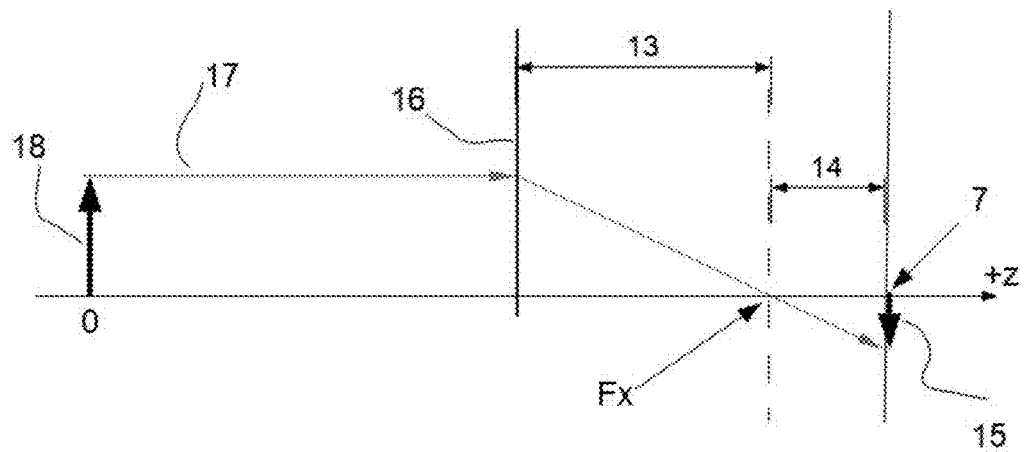
FIG. 18. An equivalent lens optics system on the x dimension.
Figure 19:
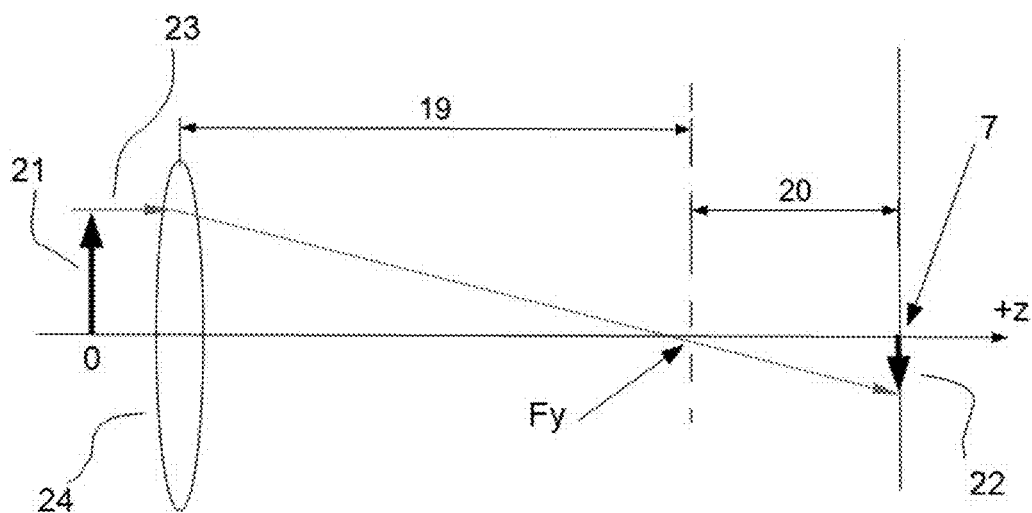
FIG. 19. A ray tracing analysis for the y dimension when using a cylindrical lens.

The first M1 reflector 4 may not be part of the calculation when it is a flat mirror. Therefore, a cylindrical lens may be placed before the first M1 reflector 4 or after the first M1 reflector 4. Preferably before the first M1 reflector 4, otherwise a larger circular surface lens, as well as a rotating first M1 reflector 4 may be needed. The second M2 reflector 2 in the shape of a cone focuses the x component of the beam 3 at a distance R from the second M2 reflector 2. To create the desired LP the work surface 1 should be placed away from the focal point either before or after the focal point f. FIG. 18 shows an equivalent optic mirror for the second M2 reflector 16 for the x axis where the focal point Fx is placed at a distance R 13 from the second M2 reflector 16. hox 18 is the x component of the collimated beam source. hix 15 is the x component of the image of the at the work surface 7. Similarly, the cylindrical lens equivalent system is shown in FIG. 19 where they axis component is resolved to an image hoy 22 where the source beam y component 21 is striking the cylindrical lens 24 with focal lens 19 placed at an optical distance greater than 2R from the work surface 7. The beam source 5 is placed at a distance 23 from lens 24.

Hix 15 and hiy may be equal at the work surface 7. For the x axis ray tracing dimensions are is resolved by:
(1) hix=hi
(2) Fx=R
(3) hox=ho
(4) Fx/Lx=hox/hix $$Lx=Fx*hix/hox=R*hi/ho$$

Similarly for the y ray tracing is resolved by:
(1) hiy=hi
(2) Fy=2.25 R
(3) hoy=ho
(4) Fx/Ly=hoy/hiy $$Ly=Fx*hiy/hoy=2.25*R*hi/ho$$

Where Lx 14 is the distance from the Fx point to point where we produce the desired LP in the x dimension and where the work surface 7 is to be placed. Similarly, Ly 20 is the distance from the Fy focal point to the work surface 7.

As an example, when R is 125 mm, ho is 5 mm, and where the desired LP is 50 urn:
hi=0.5*LP→0.025 mm; ho is the radius
Lx=125*0.025/5=0.625 mm
Ly=2.25*125*0.025/5=1.4 mm A logical Pixel LP of 50 um was created by adding a cylindrical lens 24 and positioning it between the beam source 5 and the first M1 reflector 4.

Figures 15, 16:
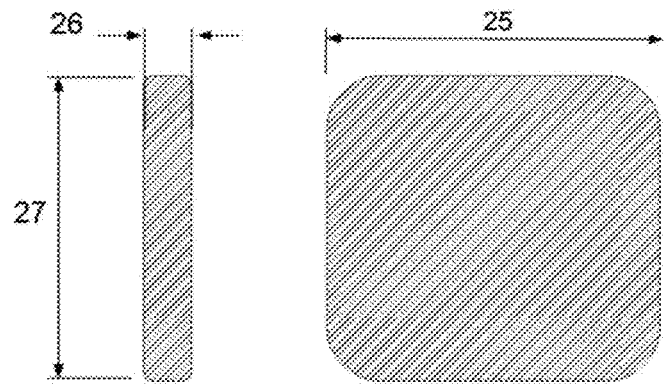
FIG. 15. Focused narrow beam on the x direction showing x and y relative dimensions FIG. 16 Logical pixel is composed from moving FIG. 15

Logical pixel LP can also be created without a cylindrical lens where a moving rectangle can create a square like LP as shown in FIGS. 15 and 16 where a narrow rectangle 26 by height 27 can generate a square with a length side 25. As an example when using a single mode laser that is able to focus to 2 um. The LP (e.g. 50 um) may be constructed by controlling the scanning speed controlling the pixel speed over an area where. The cone structure at the focus point will be producing a rectangular beam, where yfinal is 50 micrometer xfinal is 2 micrometer (from the cone).

As the scanning is performed with the first M1 reflector 4 rotating. The logical beam diameter is constructed with the control of Vm speed at the first M1 reflector 4 calculated as 2*π*R1. Tp is the on time to produce the logical pixel and T is the rotation period where f=1/T.

$$Vm=2*\pi*R*f; f \text{ is } M1 \text{ rotations/sec} \quad (1)$$

$$Lp=Vm*Tp \quad (2)$$

$$Tp=LP/(2*\pi*R*f)$$

To continue with the same example where required LP is 50 um and W0 of 2 um where f is 1 rotation/sec. The on time to generate the Lp is:

$$Tp=0.050/(0.002*125*\pi*1)=63 \text{ milliseconds}$$

Please also note that any increase in laser speed may also call for an increase in the laser power to keep the absorbed surface energy constant.

A controller may turn the pixel on for the duration of Tp. This will produce a symmetrical logical pixel where LP=Vm*Tp.

In another aspect of the invention, the beam 3 does not have to be in perfect collimation. In such a case the thin lens formula will be utilized for both to match the desired x and y dimension at the work surface 7:

$$1/fx=1/sox+1/six$$

$$1/fy=1/soy+1/siy$$

Where Fx is the focal point for the x dimension, sox is the object distance to the equivalent lens and six is the image distance to the equivalent lens. Similarly, for the x dimension sox is the object distance to the equivalent lens and six is the image distance to the equivalent lens.

In another aspect of the invention a lens may be placed between the first M1 reflector 4 and the second M2 reflector 2. In this case the lens will be annular to cover the rotating beam span.

In this method, the function of the second M2 reflector surface 2 is performing correction to bring the beam 3 into focus at the work surface 7.

Additionally, The first M1 reflector 4 changes the local x,y beam components where the second M2 reflector 2 is completing the Optical correction.

Geometrical Design of the Toroidal Mirror using M2 flat mirror

Figure 12:
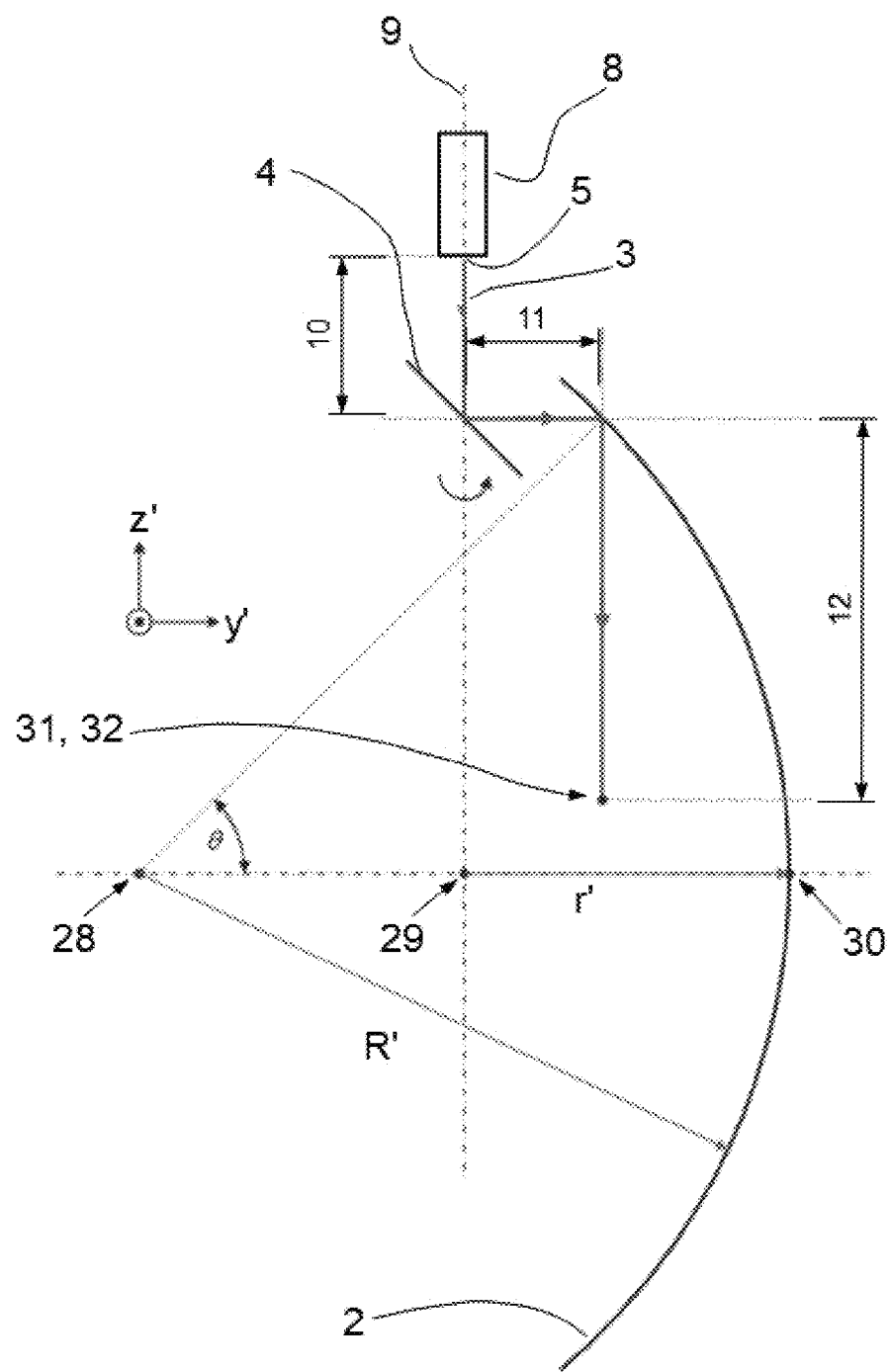

FIG. 12, presents the design parameters of the corresponding toroidal mirror for focusing the light beam 3 from the beam source 5.

Here are some of the design considerations:

FIG. 12. represents a two-mirror configuration where the second M2 reflector is toroidal and where the first M1 reflector 4 is flat. This system will be using x'y'z' coordinates. where the x' axis is directed toward the observer.

Light 3 from a beam source 8, preferably a fiber laser, is directed along the rotation axis 9 toward the first M1 reflector, 4 which may be tilted at 45° to the rotation axis 9 and/or the z axis, and rotates in about the z' axis. The beam source 5 is placed at a distance h 10 from the first M1 reflector 4 along the optical axis 9 which is also the M1 rotational axis. The striking beam 3 may then reflect from the first M1 reflector 4 to the second M2 reflector 2 in parallel to the y' axis by striking the toroidal M2 mirror and reflecting from the second M2 reflector 2 in parallel to the z' axis which is also the rotational axis 9. d 11 is the distance between the rotational axis z' and the reflected beam from M2.

C1 28 is the center of the toroidal mirror in the y'z' plane (tangential plane), C2 29 is the center of the toroidal mirror in the x'y' plane (sagittal plane), V 30 is the vertex of the toroidal mirror. The radii of the mirror are: C1–V=R' (tangential plain) and C2–V=r (sagittal plane). Angle between the beam reflection point at the second M2 reflector surface 2 and C1 and the vertex V on the x'y' plane V may be 0=45°. C2 is on the rotation axis.

The second M2 reflector equation is given as:

$$\frac{1}{p} + \frac{1}{q_T} = \frac{2}{R'\cos\theta} \quad (1)$$
$$\frac{1}{p} + \frac{1}{q_s} = \frac{2\cos\theta}{r'}$$

where p=h+d is the object distance, $q_T$ is the image distance in tangential plain (from reflection point at mirror M2 to $I_1$ 31 point) and $q_s$ is the image distance in sagittal plane (from reflection point at mirror M2 to $I_2$ 32 point). In order to have image in both plains at the same distance we impose: $q_T=q_s=q$, or equivalently:

$$\frac{1}{R'\cos\theta} = \frac{\cos\theta}{r'} \Rightarrow r' = R'\cos^2\theta \quad (2)$$

Furthermore, in order to eliminate the aberration (the smallest image size) p=q is imposed:

$$p=q=R'\cos\theta. \quad (3)$$

From the geometry presented in FIG. 12 we get:

$$C_1C_2+d=R'\cos\theta$$

$$R-r'+d=R'\cos\theta \quad (4)$$

Combining equations (2) and (4) resulted in:

$$R' - R'\cos^2\theta + d = R'\cos\theta \Rightarrow R' = \frac{d}{\cos\theta - \sin^2\theta} \quad (5)$$

As an example for d=125 mm and 0=45° we get R'=603.5534 mm and r'=301.7767 mm using equation (2). The object distance according to equation (3) is p=h+d=R' cos(0). Therefore, the distance from the beam source 5 to the rotating flat first M1 reflector is h=301.7767 mm. The image of the beam source facet according to equation (3) positioned at the distance q=426.7767 mm, so as R' sin(e)= 426.7767 mm, the image, or the working surface 7 is positioned at the main axis (at the line C1–V) of the second reflector 2.

Alternatively, the beam source 3 may come from below into a rotating first M1 reflector 4 about the Y axis, where the first M1 reflector 4 may be tilted in 45° from the Z axis.

Figures 10, 11:
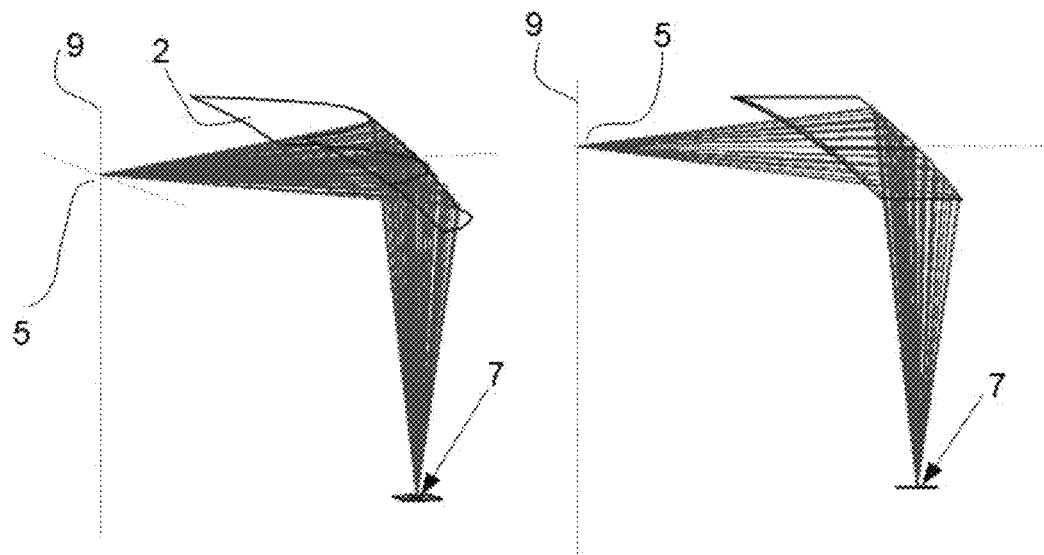
Figure 20:
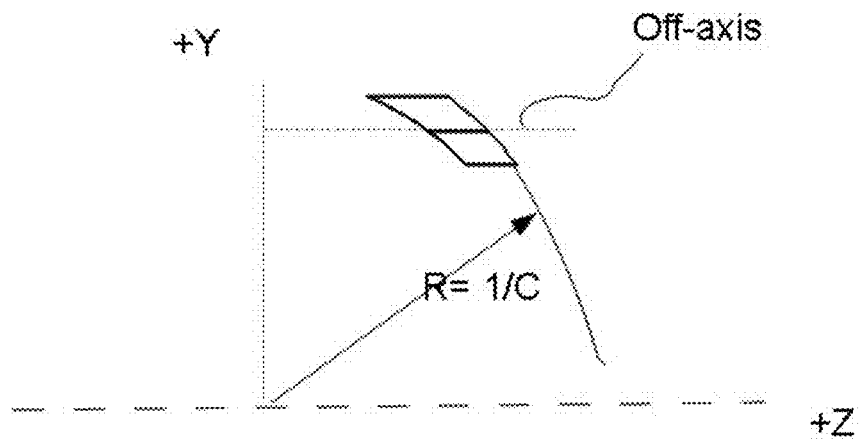
FIG. 20. Selecting the M2 surface from an off axis toroidal.

Another aspect of the invention is to use a rotating beam source 8 directed at a toroidal second reflector 2, see FIGS. 10, 11 and 20. When the light source 8 is rotating and diverging towards the second M2 reflector surface 2, where the second M2 reflector 2 is toroidal-shaped and defined by Cx, Cy and an off-axis portion is to be used. The surface 2 may be created with Cx'=−0.00165, C=−0.0033 where Cx' is defined on the XY plane and C is the curve that is swept around the Y axis. Where a selection of |C|=2|Cx'| ensured to bring the beam into focus. The selected surface 2 to use is the off-axis surface at Y ~428 mm where the beam source 8 will be rotating around the Y axis. Another aspect of this embodiment is to replace the beam source 8 with a rotating first M1 reflector, and have the beam source 8 traveling down towards a 45° into the first M1 reflector 4.

Another aspect of the invention is to use two paraboloids surfaces for the first M1 reflector 4 and the second M2 reflector 2, where the first M1 reflector 4 and the second M2 reflector 2 are identical paraboloids. The expanding beam 3 may be collimated after departing from the first M1 reflector 4. The second M2 reflector may be converging the parallel beam back to its source as in FIG. 17. The first M1 reflector 4 may be positioned so it will collimate the light coming to the second M2 reflector 2, where the second M2 reflector 2 will bring the light into focus.

Figures 9B, 9C:
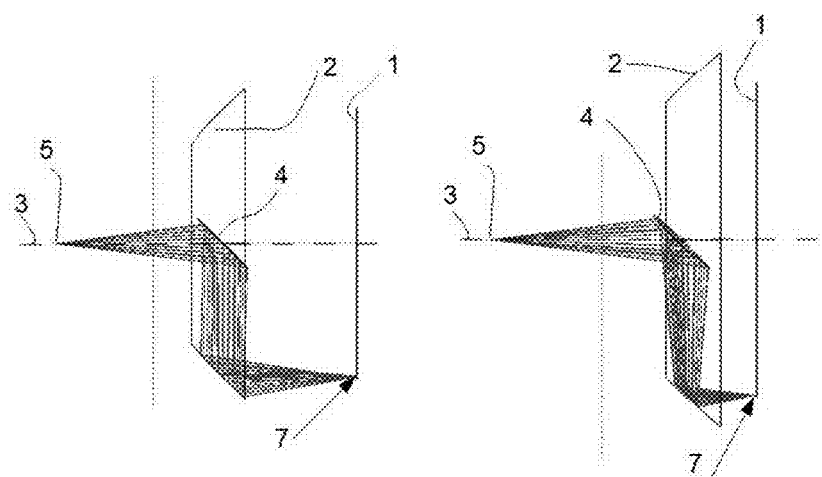
Figure 9D:
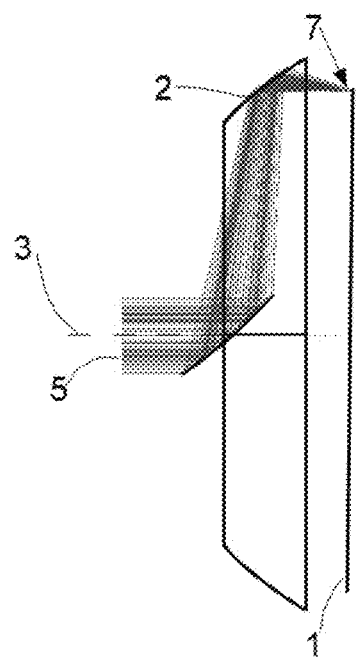

Another preferred aspect of the invention is when the first M1 reflector 4 and the second M2 reflector 2 performing the focus functions for an expanding beam where the second M2 reflector 2 may comprise a paraboloid and the first M1 reflector 4 may comprise a surface where one dimension is defined by sphere (Cx curvature, more below) and the orthogonal dimension is an aspheric (C with aspheric value) additionally the first M1 reflector surface may be pitched in about 45° degrees. See FIG. 9C & FIG. 8. In this case the second M2 reflector 2 may comprise a paraboloid and the first M1 reflector 4 may be a swept Cx' 34 around a parallel line to the y axis where its curve may be defined by curve C 35 with Aspheric value of —0.5. C~2*Cx' (C curvature is equal to about two times Cx' curvature) as this surface is rotated by ~45° degrees about a parallel to the y axis as shown in FIGS. 22A & 22B.

The first M1 surface 4 is positioned around the focal point location of the second M2 reflector 2 paraboloid where its optical axis coincides with the paraboloid. Using the vertex cartesian coordinates:

$$z(y)=C \cdot y^2/(1+\sqrt{1-S \cdot C^2 \cdot y^2})$$

Where S=0 (as Asp=−1)→z(y)=C·y²/2

Also z(y)=1/(4*P)*y²→C=½ *P where P 38 is the focal of the parabola

Figure 21:
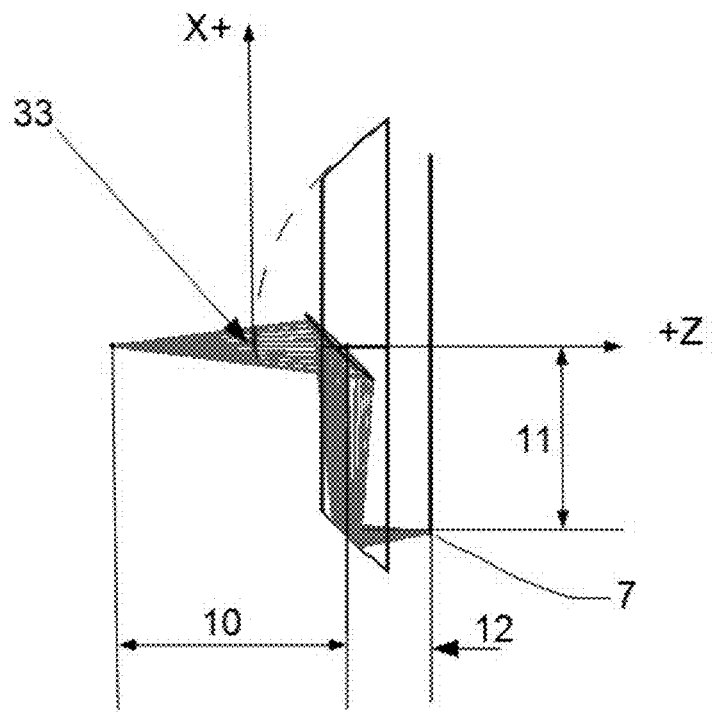
FIG. 21. Analysis of a parabolic M2 in an M1 & M2 system.

The placement of the first M1 reflector 4 and the second M2 reflector 2 is shown in FIG. 21, where the first M1 reflector 4 is placed at a distance of 110 from the vertex of the second M2 reflector 2, where the optical axis of the first reflector 4, and the paraboloids center coincide. I is about a distance P where P is the focal point of the second M2 reflector 2 (e.g. the second M2 reflector 2 may comprise a paraboloid, a rotating parabola wherein the parabola vertex 33 is at the origin of the XZ plane). Setting I=I2+I3 or about equal to will reduce the number of parameters needed where I2 12 and I3 11. The constructing parabola and location is shown in FIG. 21 and it can be expressed:

$$½*C*y^2=½*(½*P)*y^2; C \text{ is Paraboloid}$$

curvature where C=1/(2P) Or P=Rc/2 as Rc=1/C

This solution is based on finding matching surfaces. As there are numerous surfaces there is a need to match the surfaces with the opposite function if there is a need to correct a beam as an example.

In this case the beam is deflected from the first M1 reflector surface 4 with focus function imposed by the first M1 reflector surface 4. As it is facing an annular ring from the paraboloid its function should be based on a curvature as well.

Figure 23:
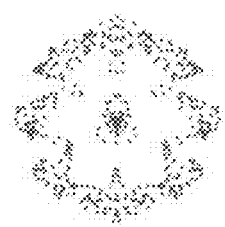
FIG. 23. Focused beam sample

As an example let's assume that we like to get a focused beam on the work area the beam with a radius R=100 mm when M1 is rotating. The paraboloid to use may have a focal point P at around R/2→50 mm. C for M2 is 1/(2P)→0.01. Set C for M1~-C of M2. C for M1 −0.01
Set Cx for M1 about equal to ½ of C M1 (because of the M2 45 degrees pitch).
Set C for M2 to −C of M1. Set the pitch angle to −45 degrees for M1. set Aspheric value to −0.5 for M1 and −1 for M2. Set M2 Z location to be at around the focal point. Set the expanding beam source at a distance to cover the desired M1 diameter (d=d0+L*Na) beam source. Set the beam goal either as WFE or to minimum beam final size target when using Zemax or any equivalent optics software to fine tune C(M1) C(M2), Cx(M1) ASP also set the pitch angle as 45.74°. Please note: some software will have more degree of freedom. Therefore, this is a suggested starting parameters
The following values are fine tuned:
C for M1=0.01; set to fixed
C for M2=−0.01043 (from −0.01)
Cx (belongs to M1)=−0.0049 (from −0.5)
Asp for M1=−0.45 (from −0.5)
M1 distance to M2 vertex z distance=50.79 (from 50)
The focused beam shown in FIG. 23 is 105 urn reflecting a fiber optic source input of 105 um.
Setting another fix setting (set ASP to fixed −0.5 or C for M2 or pitch) is producing another set of working values with the same size output beam.
Another way to design the surface is by simply using existing surfaces and scale it.
Let's say that we want an arc with a radius of 250 mm and not 100. Then we adjust all dimensions proportionally:
C for M1=0.01; set to fixed→0.01*⅖→0.004
C for M2=−0.01043 (from −0.01)→0.004172
Cx (belongs to M1)=−0.0049 (from −0.5)→−0.00196
Asp for M1=−0.45 (from −0.5); Pure number no change
M1 distance to M2 vertex z distance=50.79 (from 50)→5/2*50.79→126.975

Another aspect of the invention is to set the focal parameter so it will generate a focus in one direction therefore generating a long rectangular like line. This line can be used as a physical pixel where it will generate a logical pixel as shown in FIG. 16.

Figure 25:
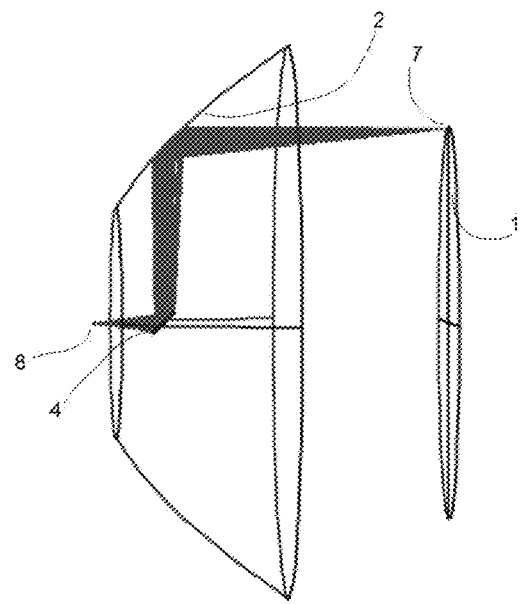
FIG. 25. M1, M2 constructed away from the work surface

Yet, another aspect of the invention is to keep expanding the beam after the first M1 reflector as in FIG. 25. This will create a longer focal point for the system. Therefore, the beam director will be far from the work surface 7 as the bulk of the fousing function is done by the paraboloid second M2 reflector 2. This system may be achieved by selecting: C for M1 −0.007, Cx for m1 −0.0033, pitch of −45 degrees asp ~−0.5. A motivation to keep as much as possible the optics components away from the work surface 1 as the work surface may be relatively in a high temperature when printing 3D metal parts as an example.

Figure 26:
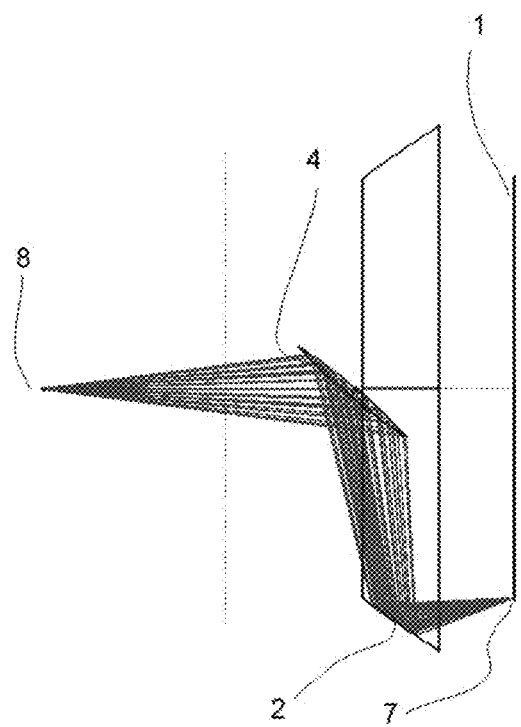
FIG. 26. M1, M2 construction when M1 is pushed back in relation to M2

In another aspect of the invention it is necessary to have the first M1 reflector 4 on the lower Z coordinates below the second M2 reflector 2. In this case the pitch of the first reflector 4 may be set to around 49°. Increasing the angle will push the first M1 reflector 4 further back as in FIG. 26.

Although, Cx' is a toric definition for a curve C (or any function swept around the y axis) that has an aspherical value Asp where aspherical value defines the departure from a sphere (asp for sphere is 0). An alternate definition and more elaborate can be used where Cx and Cy are defined with their respective AspY and AspY spherical values. This definition has a higher degree of freedom as Cx can be an Aspheric as well. When Cx,Cy and their respective aspherical values are called biconic surfaces, FIG. 8 shows a biconic construction performed on reflector M1 4. Additionally, Aspherical values can be defined in alternate ways as Shape where Shape=Asp+1. As Shape default value 1 represents a sphere. Similarly or alternatively, a surface can be defined with two orthogonal ellipses where their vertices meet at the surface optical axis.

Figure 17:
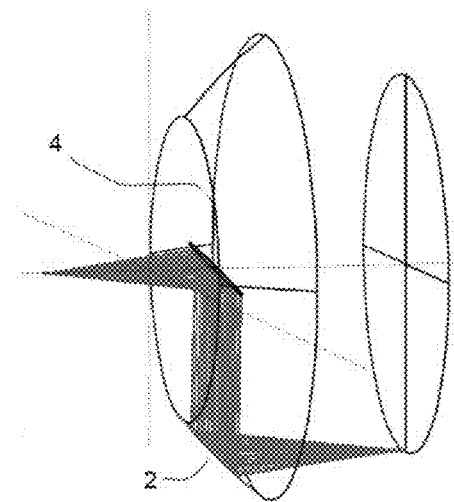
FIG. 17. Focusing a diverging beam with off axis matching parabolas.
Figure 27:
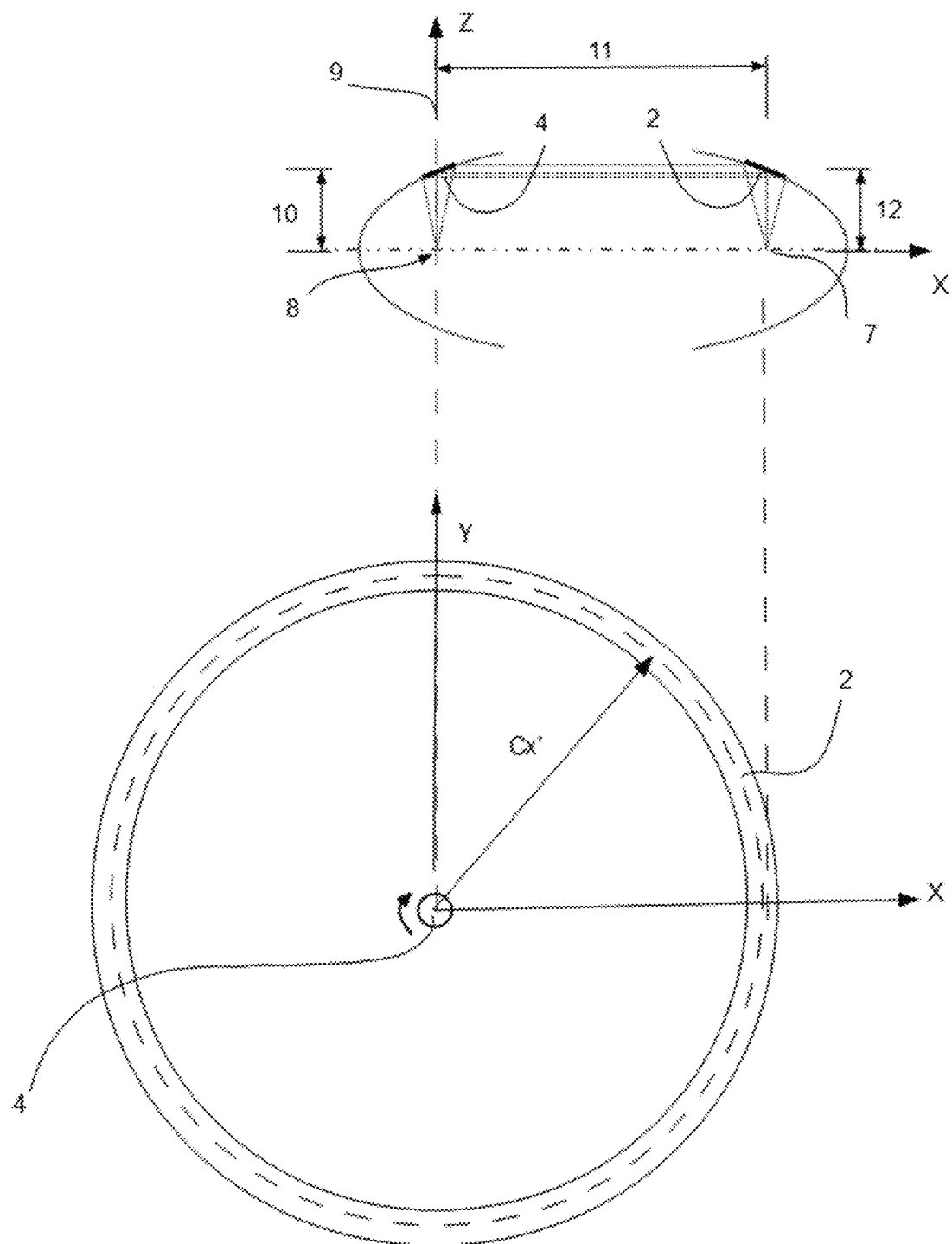
FIG. 27 M1 & M2 constructed from the same parabolic properties
Figure 28:
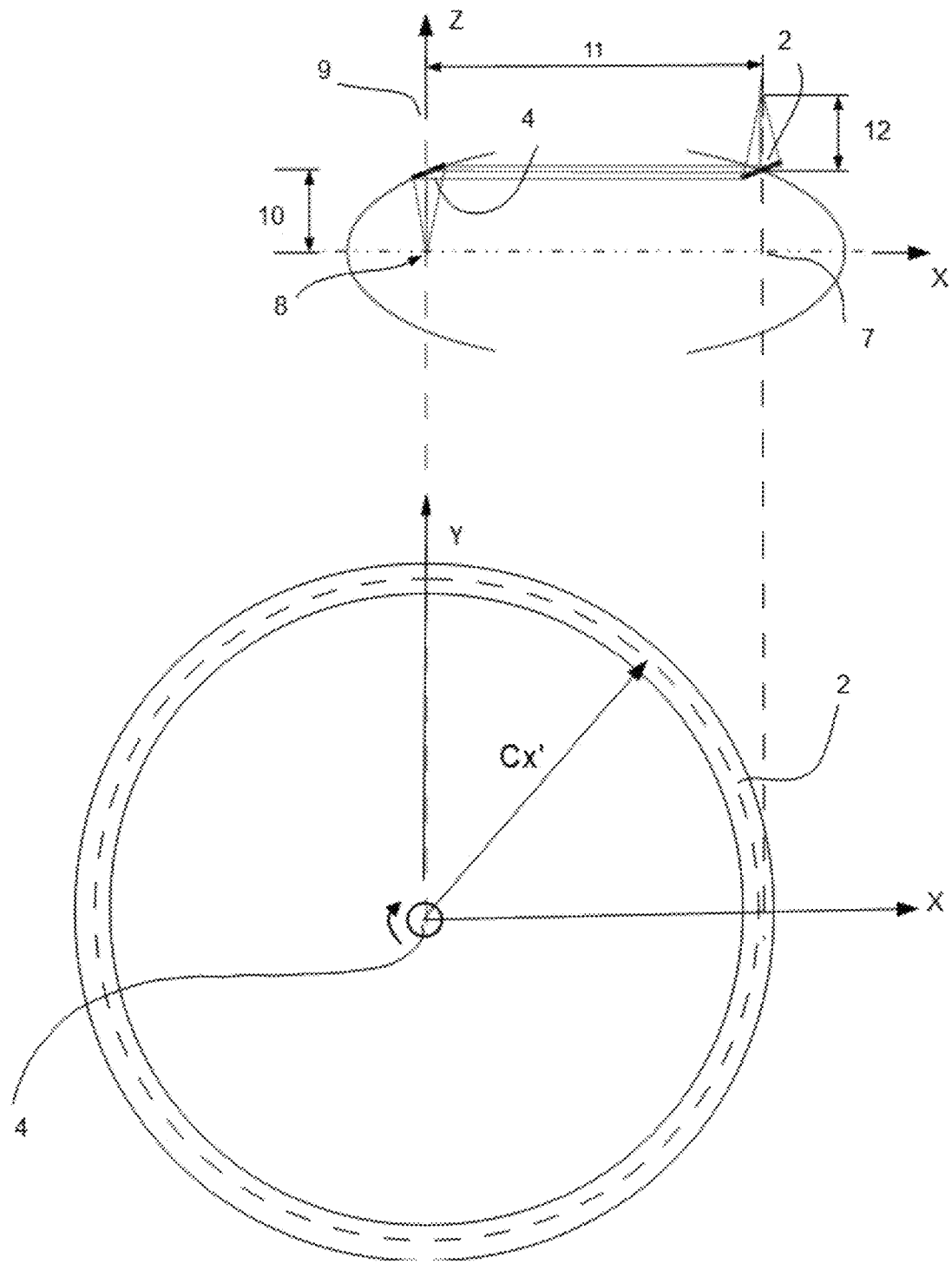
FIG. 28 Alternative and practical setting for M1 & M2 for FIG. 27

Yet, another aspect of the invention is using the same parabola curvature for the first M1 reflector 4 and the second M2 reflector 2 as shown in FIG. 27 where the beam source 8 is located at the paraboloid focal point and where the second matching surface reflecting a converging beam to at the work surface 7 which is also the focal point of the parabola where the distance between the first M1 reflector 4 and the second M2 reflector 2 may be any distance because of the collimated beam between the surfaces. When the distance R 11 is selected then the second M2 reflector 2 ring is created by swapping around the parabola curve at a distance R or curvature Cx'=1/R. In practicality, the second M2 reflector surface 2 should be negative mathematically as the first M1 reflector 4 faces the second M2 reflector 2 at all times. Additionally, the second M2 reflector surface 2 may be flipped vertically so the focus point will be away from the beam source 5 as it is shown in FIG. 28 and FIG. 17. This system is imposing distance 10 and 12 to be the same. This is an additional advantage in the assembly process where optics calibration is mitigated compare to other systems as the same off Axis portion of the paraboloid facing the paraboloid focal point is selected for both M1 4 and M2 2 surfaces where the parabolic segment for M1 and M2 are matching.

Figures 13, 14:
Figure 24:
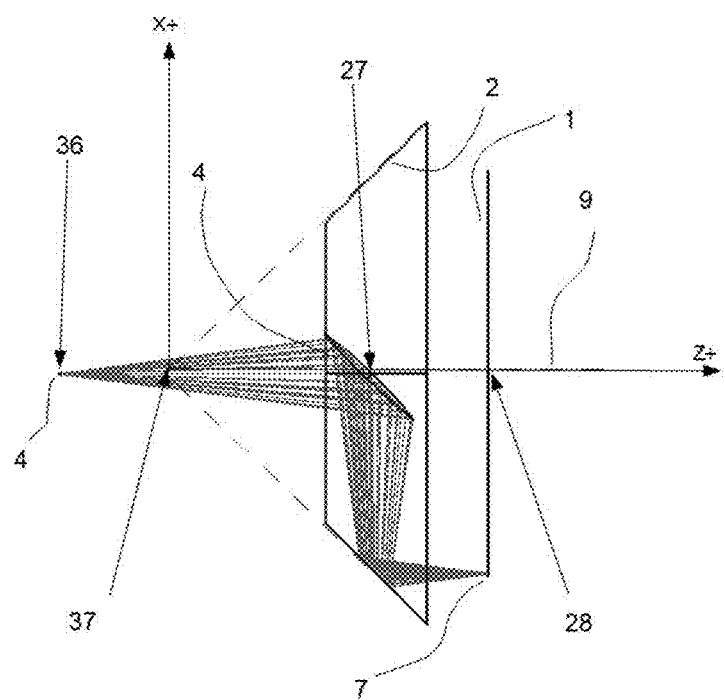
FIG. 24. M1 biconic with flat M2
Figure 24B:
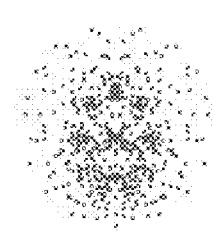
FIG. 24B. Beam output from the system in FIG. 24.

Another aspect of the invention is to use a flat second M2 reflector 2 (cone). Then, the first M1 reflector may comprise Biconic surfaces, where the curve Cx is aspheric and Cy is apheric as well. The following parameters will produce the first M1 reflector 4, where the work surface radius may be 100 mm. Please note: the mm unit is not crucial. They can be inches or any other units or multipliers when using multipliers then all dimensions need to be corrected as shown earlier. FIG. 24 shows a layout of the system and FIG. 24B the resulting final beam. FIG. 13 also shows the diverging beam source shape and FIG. 14 the desired beam shape and size at the work surface 7. FIG. 14 is the desired beam for all other samples in this document when dealing with expanding beams. In this instance the beam is expanding with Na of 0.15.

M1 with Cy=−0.00769 and Aspy=−0.8, Cx=−0.00451, Aspx=1, Pitch=45.4 degrees will produce a focused output in the same as the source beam (105 um):

FIG. 24. shows the placement of M1, M2 and the beam source along the Z axis measured in mm when the Origin is at the M2 vertex as follows:

Beam source Z coordinate 36 t: −57.7
Vertex cone at coordinate 37: 0 (origin)
M1 coordinate 27: 97.7
Work area at 28: 155.6

Accordingly, an object of the present invention is to address the optical design of the components for handling the beam of the prior art by providing corrective elements, whereby the beam has the desired dimensions in the first and second direction when incident on the work surface or when the beam keeps the proportion between the first and second directions when incident on the work surface.

The invention claimed is:

1. A beam director comprising:
a beam source rotatable about a longitudinal axis,
an actuator for rotating the beam source about the longitudinal axis, whereby the beam source rotates and reflects the beam at a constant angle to the longitudinal axis;
an annular reflector encircling the beam source coinciding with the longitudinal axis of the rotating actuator; constantly facing the beam source at a constant angle;
a second reflector including a reflective surface at an acute angle to the longitudinal axis for reflecting the beam, configured to reflect the beam towards a work surface at a constant angle thereto; and
a beam corrector comprising a reflective surface on the second reflector for modifying the beam dimensions;
whereby when the beam is activated and the actuator rotates the beam source, the beam strikes the reflector rotating the beam and reflecting the beam to the work surface; the beam then following a curved path relative to the work surface, tracing out an arc on the work surface; and
wherein the beam corrector comprises a reflective surface on the second reflector with curvature correction in the first (x') direction and in the second perpendicular direction (y');
wherein the second reflector comprises a toroidal surface with curvature C1 in a first direction and curvature C2 in a second perpendicular direction;
wherein the beam source is a distance d from a toroidal origin and rotatable along the C1 surface; and
wherein the longitudinal axis is parallel with a toroidal vertical axis.

2. A beam director comprising:
a rotatable first reflector rotatable about a longitudinal axis for receiving a beam from a beam source along the longitudinal axis, the first reflector including a reflective surface at an acute angle to the longitudinal axis for reflecting the beam;
an actuator for rotating the first reflector about the longitudinal axis, whereby the first reflector rotates and reflects the beam at a constant angle to the longitudinal axis;
an annular second reflector encircling the first reflector, a center of the first reflector coincides with the longitudinal axis of the first reflector, constantly facing the first reflector at a constant angle; the second reflector configured to reflect the beam towards a work surface at a constant angle thereto;
a beam corrector comprising a reflective surface on the second reflector for modifying the beam dimensions;
whereby when the beam is activated and the actuator rotates the first reflector, the beam strikes the rotating first reflector rotating the beam and reflecting the beam to the second reflector, which reflects the beam to the work surface; the beam then following a curve path relative to the work surface, tracing out an arc on the work surface;
wherein the reflective surface of the first and second reflectors changes the beam dimensions to a desired dimension in either a first (x') direction or in a second perpendicular direction (y') or in both;
wherein the first reflective surface comprises a lying on a first plane orthogonal to a second curve lying on a second plane where the first and second planes are orthogonal and vertex's of the first and second curves meet at the longitudinal axis;
wherein the second reflector includes a toric surface where the toric surface is a surface swept out when a function z(y) is rotated about an axis that is parallel to local y axis represented by:

$$z(y)=C \cdot y^2/(1+\sqrt{1-(\text{Asph}+1) \cdot C^2 \cdot y^2})+A_1 \cdot y+A_2 \cdot y^2+ \ldots + A_{14} \cdot y^{14}$$

wherein the function is rotated at a distance 1/Cx' where Cx' is the reciprocal of the radius of the circle in the xz plane;
wherein Asph is a value representing a departure from a sphere shape;
wherein polynomials coefficients $A_j$ for any j from 0 to 14 is 0 when C is non zero or when C is zero then at least one of the $A_j$ coefficient is non zero;
wherein the polynomial coefficients provide a higher degree of definition to the rotated function z(y); and
where C is the curvature defining the rotated function.

3. The beam director according to claim 2
wherein the first mirror comprises a rotating flat mirror at an acute angle of 45 degrees from the longitudinal axis, and
wherein the beam source is positioned along the longitudinal axis, whereby the beam source directs the beam to the first reflector and the first reflector reflects the beam to the toroidal surface, whereby, the beam is activated according to the equations:

$$C_1 C_2 + d = R \cos \theta$$

$$R - r' + d = R \cos \theta \quad (4)$$

where the second mirror comprises a toroidal surface
where V is the toroidal vertex
where C1 is the first center of a first toroidal with a radius R' laying on the zy plane
where C2 is a second center for a second toroidal radius r' laying on the xy plane
where the beam source is perpendicular to a line connecting C1, V and C2
where the beam source optical axis is on C2
where the beam is reflected from the first reflector striking at the second reflector at M2 of the Toroidal surface and in a distance d from the source optical axis
where q is the distance from the second reflector M2 to a point I at the work surface
where q=d+h and the angle in the triangle M2 C1 V is θ

R' is calculated by:

$$R' - R'\cos^2\theta + d = R'\cos\theta \Rightarrow R' = \frac{d}{\cos\theta - \sin^2\theta} \quad (5)$$

and r' is calculated by:

$$\frac{1}{R'\cos\theta} = \frac{\cos\theta}{r'} \Rightarrow r' = R'\cos^2\theta \quad (2)$$

4. The beam director according to claim 2,
wherein the second reflector comprises a paraboloid surface, and
wherein the first reflector comprises a biconic surface, wherein a first surface comprises a spherical surface, and an orthogonal second curved surface with an aspherical surface value between 0 and −1, and pitch in about 45 degrees.

5. The beam director according to claim 2,
wherein the first reflector is a biconic surface comprises a spherical surface, and a second surface comprising an aspherical surface, and
wherein the aspherical surface and the spherical surface meet at a vertex.

6. The beam director according to claim 2,
wherein the second reflector is configured to focus the beam only in one direction; and
wherein the one direction is used to construct a logical pixel.

7. The beam director according to claim 2, wherein the first reflector comprises a first paraboloid surface, and second spherical plane;
wherein the second reflector comprise a second paraboloid surface; and
wherein the first surface is pitched at about 45 degrees;
wherein the vertex of the first reflector is facing an off-axis portion of the second reflector at around P where P is the second reflector focal point on the paraboloid plane.

8. The beam director according to claim 7, wherein the first reflector paraboloid surface is substantially identical to the second reflector paraboloid surface.

9. The beam director according to claim 2,
wherein the second reflector comprises a conical surface, wherein the first reflector comprises a biconic surface;
wherein a first curvature of a first biconic surface is about twice a second curvature of a second biconic surface; and
wherein the aspherical value for the first biconic surface is about −0.8
wherein the aspherical value for the second surface is about 1
wherein the first reflector is pitched in an acute angle ~45 degrees.

10. The beam director according to claim 2,
wherein the second reflector comprises a conical surface, wherein the second reflector is configured to focus the beam only in one direction; and
wherein the one direction is used to construct a logical pixel, where the logical beam size is controlled by the beam speed.

11. A beam director comprising:
a rotatable first reflector rotatable about a longitudinal axis for receiving a beam from a beam source along the longitudinal axis, the first reflector including a reflective surface at an acute angle to the longitudinal axis for reflecting the beam;
an actuator for rotating the first reflector about the longitudinal axis, whereby the first reflector rotates and reflects the beam at a constant angle to the longitudinal axis;
an annular second reflector encircling the first reflector, a center of the first reflector coincides with the longitudinal axis of the first reflector, constantly facing the first reflector at a constant angle; the second reflector configured to reflect the beam towards a work surface at a constant angle thereto;
a beam corrector comprising a reflective surface on the second reflector for modifying the beam dimensions;
whereby when the beam is activated and the actuator rotates the first reflector, the beam strikes the rotating first reflector rotating the beam and reflecting the beam to the second reflector, which reflects the beam to the work surface; the beam then following a curve path relative to the work surface, tracing out an arc on the work surface;
wherein the reflective surface of the first and second reflectors changes the beam dimensions to a desired dimension in a first (x') direction and in a second perpendicular direction (y');
wherein the first reflective surface comprises a biconic surface where the first curve is lying on a first plane orthogonal to a second curve lying on a second plane where the first and second planes are orthogonal and vertex's of the first and second curves meet at the longitudinal axis;
wherein the second reflector includes a toric surface where the toric surface is a surface swept out when a function z(y) is rotated about an axis that is parallel to local y axis represented by z(y).

12. The beam director according to claim 11,
wherein the second reflector comprises a paraboloid surface z(y), and
wherein the first reflector comprises a biconic surface, wherein a first plane curve comprises a spherical surface, and an orthogonal second plane curve comprises a surface with an aspherical value between 0 and −1, and pitch in about 45 degrees.

13. The beam director according to claim 12, wherein the vertex of the first reflector is facing an off-axis portion of the second reflector at around P where P is the second reflector focal point on the paraboloid plane.

14. The beam director according to claim 11,
wherein the second reflector is configured to focus the beam only in one direction; and
wherein the one direction is used to construct a logical pixel where the logical beam size is controlled by the beam speed.

15. The beam director according to claim 11, wherein the first reflector paraboloid surface is substantially identical to the second reflector paraboloid surface.

16. The beam director according to claim 11, wherein the first reflector comprises a first paraboloid surface, and second spherical plane,
wherein the second reflector comprise a cone surface; and
wherein the first surface is pitched at about 45 degrees;
wherein the vertex of the first reflector is facing an off-axis portion of the second reflector at around P where P is the second reflector focal point on the paraboloid plane.

17. The beam director according to claim 11, wherein the first reflective surface comprises a first spherical curve lying on a first plane orthogonal to a second parabolic curve lying on a second plane where the first and second planes are orthogonal and vertex's of the first and second curves meet at the longitudinal axis.

18. The beam director according to claim 11,
wherein the second reflector includes a toric surface where the toric surface is composed of a surface swept out at a distance Cx' when a function $z(y)=y$ is rotated about an axis that is parallel to the local y axis.

19. The beam director according to claim 11,
wherein the second reflector includes a toric surface where the toric surface is composed of a surface swept out at a distance Cx' when a function $z(y)=4*P*y^2$ is rotated about an axis that is parallel to the local y axis; and
wherein the first reflector is positioned at about p distance from the vertex of the second reflector,
where P is the focal point f the function.

20. The beam director according to claim 11,
wherein the second reflector includes a tonic surface where the tonic surface is composed of a surface swept out at a distance Cx' when a function $z^2+y^2=r^2$ rotated about an axis that is parallel to the local y axis;
where r is the radius of the sphere surface.

\* \* \* \* \*